United States Patent
Gilberton et al.

(10) Patent No.: US 10,038,945 B2
(45) Date of Patent: Jul. 31, 2018

(54) APPARATUS AND METHOD FOR ACTIVITY MONITORING

(71) Applicant: THOMSON LICENSING, Issy les Moulineaux (FR)

(72) Inventors: Philippe Gilberton, Geveze (FR); Guillaume Bichot, La Chapelle Chaussee (FR); Ali Louzir, Rennes (FR)

(73) Assignee: Thomson Licensing (FR)

( * ) Notice: Subject to any disclaimer, the term of this patent is extended or adjusted under 35 U.S.C. 154(b) by 4 days.

(21) Appl. No.: 14/952,608

(22) Filed: Nov. 25, 2015

(65) Prior Publication Data

US 2016/0150299 A1 May 26, 2016

(30) Foreign Application Priority Data

Nov. 26, 2014 (EP) .................... 14306884

(51) Int. Cl.
*H04Q 9/00* (2006.01)
*H04W 4/029* (2018.01)
*G08B 21/04* (2006.01)
*H04L 12/46* (2006.01)
*H04W 4/02* (2018.01)

(52) U.S. Cl.
CPC ........... *H04Q 9/00* (2013.01); *G08B 21/0423* (2013.01); *H04L 12/4625* (2013.01); *H04W 4/028* (2013.01); *H04W 4/029* (2018.02); *Y02D 70/00* (2018.01); *Y02D 70/142* (2018.01); *Y02D 70/144* (2018.01); *Y02D 70/166* (2018.01); *Y02D 70/26* (2018.01)

(58) Field of Classification Search
CPC .... H04Q 9/00; G08B 21/0423; H04L 12/282; H04L 12/4625; H04W 4/028
See application file for complete search history.

(56) References Cited

U.S. PATENT DOCUMENTS 7,701,332 B2   4/2010   Anderson
8,525,673 B2   9/2013   Tran
(Continued)

FOREIGN PATENT DOCUMENTS

EP   1071055   1/2001
EP   2472487   7/2012
(Continued)

OTHER PUBLICATIONS

Anonymous, "Smart Beacons",http://www.smartbeacon.eu/, 2013, pp. 1-4.
(Continued)

*Primary Examiner* — James Yang
(74) *Attorney, Agent, or Firm* — Jack Schwartz & Associates, PLLC

(57) ABSTRACT

An electronic apparatus includes a communication unit that communicates with a tag located within a target region when the communication unit is active within the target region, and a processor configured to monitor an activity within the target region based on status information from the tag received by the communication unit, wherein the activity comprises at least one of opening and closing of a member arranged within the target region.

15 Claims, 3 Drawing Sheets

(56) References Cited

U.S. PATENT DOCUMENTS

| | | | | |
|---|---|---|---|---|
| 2006/0220834 A1* | 10/2006 | Maeng | .................. | G08B 21/24 340/539.1 |
| 2007/0171091 A1* | 7/2007 | Nisenboim | ............ | G08C 17/00 340/12.24 |
| 2015/0370615 A1* | 12/2015 | Pi-Sunyer | .............. | G05B 15/02 700/276 |

FOREIGN PATENT DOCUMENTS

| | | |
|---|---|---|
| EP | 2704366 | 3/2014 |
| EP | 2733449 | 5/2014 |
| JP | 2002092767 | 3/2002 |
| WO | 2004093024 | 10/2004 |
| WO | 2009070754 | 6/2009 |
| WO | 2010017138 | 2/2010 |

OTHER PUBLICATIONS

Anonymous, "How Does Beacon Work?", http://www.beaconic.nl/en/, 2015, pp. 1-6.
Nakauchi et al: "Human Intention Detection and Activity Support System for Ubiquitous Sensor Room"; Feb. 12, 2004; pp. 1-8.
Search Report dated May 18, 2015.

\* cited by examiner

APPARATUS AND METHOD FOR ACTIVITY
MONITORING

This application claims the benefit, under 35 U.S.C. § 119 of European Patent Application No. 14306884.9, filed Nov. 26, 2014.

FIELD

The present disclosure generally relates to an apparatus and a method for activity monitoring.

BACKGROUND

Monitoring and recognition of user activities using home appliances can be realized by a smart-home, and more generally, IoT (Internet of Things) initiatives.

Some home appliances are equipped with a communication means for making a wireless or wired Internet connection to notify statuses thereof in real-time, and can provide a means for inferring the user activities. An example of such a system is proposed in Japanese Laid-Open Patent Publication No. 2002-92767. However, this proposed system requires each of the home appliances to be equipped with the communication means for making the wireless or wired Internet connection via a home terminal.

As a result, according to this proposed system, the cost of the home appliance equipped with the communication means increases, because of the need to exclusively design and manufacture the home appliance to be equipped with the communication means. In addition, it may be difficult and troublesome for the user to set up the home appliance equipped with the communication means, particularly in a case in which the wired Internet connection is required via the home terminal. Furthermore, it may be difficult to suppress the power consumption of the home terminal since the home terminal constantly monitors the statuses of the home appliance.

SUMMARY

According to an aspect of the present disclosure, an electronic apparatus may comprise a first communication unit configured to communicate with a tag located within a target region when the first communication unit is active within the target region; and a processor configured to monitor an activity within the target region based on intensity of the status signal from the tag received by the first communication unit, wherein the activity comprises at least one of opening and closing of a member arranged within the target region.

According to another aspect of the present disclosure, an activity monitoring method to be implemented in an electronic apparatus, may comprise communicating with a tag located within a target region when a first communication unit of the electronic apparatus is active within the target region; and monitoring, by the first communication unit, an activity within the target region based on intensity of the status signal received from the tag, wherein the activity comprises at least one of opening and closing of a member arranged within the target region.

According to another aspect of the present disclosure, a computer program product downloadable from a communication network and/or recorded on a medium readable by computer and/or executable by a processor, comprising program code instructions for implementing an activity monitoring method may comprise communicating with a tag located within a target region when a first communication unit of the electronic apparatus is active within the target region; and monitoring, by the first communication unit, an activity within the target region based on intensity of the status signal received from the tag, wherein the activity comprises at least one of opening and closing of a member arranged within the target region.

According to yet another aspect of the present disclosure, a non-transitory computer-readable medium comprising a computer program product recorded thereon and capable of being run by a processor, including program code instructions for implementing an activity monitoring method may comprise communicating with a tag located within a target region when a first communication unit of the electronic apparatus is active within the target region; and monitoring, by the first communication unit, an activity within the target region based on intensity of the status signal received from the tag, wherein the activity comprises at least one of opening and closing of a member arranged within the target region.

The object and advantages of the present disclosure will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present disclosure will be described with reference to the accompanying drawings.

A description will now be given of an electronic apparatus and an activity monitoring method, in each embodiment according to the present disclosure.

Figure 1:
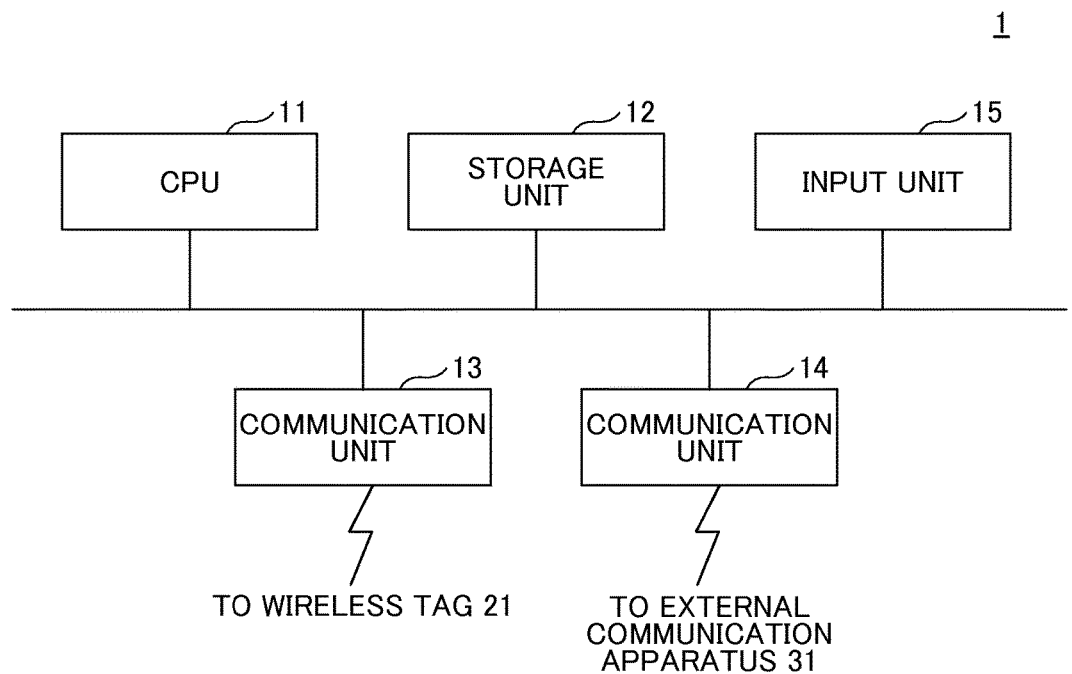
FIG. 1 is a block diagram illustrating an example of a configuration of an electronic apparatus in one embodiment of the present disclosure.

FIG. 1 is a block diagram illustrating an example of a configuration of an electronic apparatus in one embodiment of the present disclosure. An electronic apparatus 1 illustrated in FIG. 1 includes a CPU (Central Processing Unit) 11, a storage unit 12, communication units 13 and 14, and an input unit 15, which may be connected via a bus or any suitable connecting means.

The electronic apparatus 1 may be portable and/or wearable by a user. Further, the electronic apparatus 1 may be formed by a smartphone, a tablet, a personal digital assistant, a smartwatch, a dedicated apparatus, such as an activity monitoring apparatus, exclusively for performing an activity monitoring process which will be described later, or the like. The electronic apparatus 1 can freely enter or leave a target region in which user activities are to be monitored. The target region may be formed by a room in a house or a building, an interior of a vehicle, or the like.

The CPU 11 is an example of a processor that controls the operation of the electronic apparatus 1. The storage unit 12 stores programs to be executed the CPU 11, and various data including data or parameters used by the programs, intermediate data of computations performed by the programs, data monitored by the activity monitoring process, data related to a log of the monitored data, or the like. The storage unit 12 may be formed by a semiconductor memory device or the like, for example.

The communication unit 13 is an example of a first communication unit that may be in wireless connection with a wireless tag 21 illustrated in FIG. 2 which will be described later, when the first communication unit (that is, the communication unit 13) is active. The communication unit 14 is an example of a second communication unit that is wirelessly communicable with an external communication apparatus 31 illustrated in FIG. 3 which will be described later. For the sake of convenience, the illustration of an antenna or a microphone of the communication unit 13 and an antenna of the communication unit 14 is omitted in FIG. 1.

The CPU 11 performs a process including monitoring a user activity within the target region based on status information received by the communication unit 13 that is active, from the wireless tag 21 that is associated with a house furnishing located within the target region. The user activity includes at least one of opening and closing of a member of the house furnishing arranged within the target region. As will be described later, the member may be provided on a casing of the house furnishing arranged inside the target region, and the wireless tag 21 may be provided inside the casing, for example. In addition, the casing may be enclosed in a state in which the member is closed.

The process performed by the CPU 11 may further include determining whether the electronic apparatus 1 is located within the target region. In this case, the monitoring by the CPU 11 may monitor the user activity within the target region, by activating the communication unit 13 when the determining determines that the electronic apparatus 1 is located within the target region. On the other hand, the CPU 11 may deactivate the communication unit 13 when the determining determines that the electronic apparatus 1 is not located within the target region.

The input unit 15 may receive a user input, such as an entry input, indicating that the electronic apparatus 1 is within the target region. For example, the user may make the user input from the input unit 15 when the user carrying the electronic apparatus 1 enters the target region. In this case, the determining by the CPU 11 may determine that the electronic apparatus 1 is located within the target region in response to receiving the user input, such as the entry input, from the input unit 15. Further, the user may make a user input, such as an exit (or cancel) input, from the input unit 15 when the user carrying the electronic apparatus 1 leaves the target region. In this case, the determining by the CPU 11 may determine that the electronic apparatus 1 is located outside the target region in response to receiving the user input, such as the exit input, from the input unit 15. The communication unit 14 may be omitted in this case.

For example, the input unit 15 may be formed by a keyboard, a speech recognition system, or the like. The input unit 15 may also be formed by a touchscreen panel which includes functions of both the keyboard and a display.

Alternatively, the determining by the CPU 11 may determine that the electronic apparatus 1 is located within the target region in response to receiving location information from the external communication apparatus 31 that is wirelessly communicable with the communication unit 14, and determine that the electronic apparatus 1 is located outside the target region in response to not receiving the location information from the external communication apparatus 31 that is wirelessly communicable with the communication unit 14, or in response to receiving location information of an apparatus other than the external communication apparatus 31.

The process performed by the CPU 11 may further include detecting a duration time for which the member of the house furnishing is open, based on the status information. The process performed by the CPU 11 may further include raising an alarm when the duration time detected by the detecting exceeds a threshold time period. The CPU 11 may display the alarm on the display of the touchscreen panel forming the input unit 14, if preferred. The process performed by the CPU 11 may further include storing, in the storage unit 12, the user activity monitored by the monitoring by the CPU 11, the duration time detected by the detecting by the CPU 11, and the alarm raised by the raising by the CPU 11, for example. The CPU 11 may display the user activity monitored by the monitoring by the CPU 11, the duration time detected by the detecting by the CPU 11, and the alarm raised by the raising by the CPU 11 on the display of the touchscreen panel forming the input unit 14, if preferred.

Figure 2:
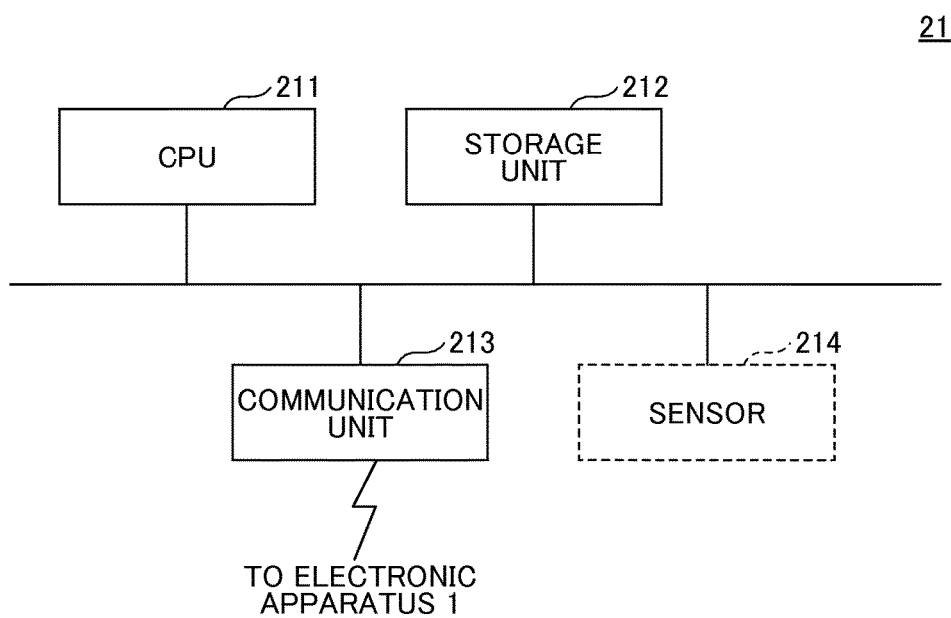
FIG. 2 is a block diagram illustrating an example of a configuration of a wireless tag in one embodiment of the present disclosure.

FIG. 2 is a block diagram illustrating an example of a configuration of the wireless tag in one embodiment of the present disclosure. The wireless tag 21 is provided at a location capable of broadcasting a status signal to the electronic apparatus 1 that enters the target region. For example, the wireless tag 21 may be provided within the casing of the house furnishing that is arranged within the room forming the target region. The wireless tag 21 illustrated in FIG. 2 includes a CPU 211, a storage unit 212, and a communication unit 213. The wireless tag 21 may be a passive or active type tag.

In a case in which the wireless tag 21 is an active type tag, the wireless tag 21 may additionally include a sensor 214 indicated by a dotted line in FIG. 2. In this case, the wireless tag 21 includes a battery to power the sensor 214 and the like of the wireless tag 21. However, the illustration of the battery that powers the wireless tag 21 is omitted in FIG. 2 for the sake of convenience.

The CPU 211 is an example of a processor that controls the operation of the wireless tag 21. The storage unit 212 stores programs to be executed the CPU 211, and various data including data or parameters used by the programs, intermediate data of computations performed by the programs, data related to status signals which will be described later, or the like.

The CPU 211 may be replaced by dedicated hardware, such as a control circuit which controls the operation of the wireless tag 21.

The storage unit 212 may be formed by a semiconductor memory device or the like, for example. The communication unit 213 is an example of a second communication unit that is wirelessly communicable with the active communication unit 13 of the electronic apparatus 1. For the sake of convenience, the illustration of an antenna or a speaker of the communication unit 213 is omitted in FIG. 2.

In a case in which the wireless tag 21 additionally includes the sensor 214, the sensor 214 may sense the user activity, such as an opening or a closing of the member of the house furnishing. The wireless tag 21 may be provided at any position capable of sensing the user activity by the sensor 214, and the wireless tag 21 does not necessarily have to be provided on or provided inside the house furnishing. For example, the sensor 214 may be formed by a light sensor, a volumetric sensor, or the like. In this case, the status signal indicating at least the user activity sensed by the sensor 214 may be broadcasted from the communication unit 213 to be received by the active communication unit 13 of the electronic apparatus 1. More particularly, the CPU 211 may control the communication unit 213 to periodically broadcast the status signal indicating at least the user activity only when the sensor 214 senses the user activity. The periodicity of the status signal broadcasting that is asynchronous with the monitoring of the status signal by the electronic apparatus 1 will determine the responsiveness of the electronic apparatus 12 as an activity monitoring apparatus.

Depending on a configuration of the wireless tag 21, the communication unit 13 of the electronic apparatus 1 may communicate with the communication unit 213 of the wireless tag 21 by a signal selected from an RF (Radio Frequency) signal operating, for example, in a UHF (Ultra-High Frequency) band, an ISM (Industry Science Medical) band, 2.4 GHz band or for example in compliancy with the standard Bluetooth™ Low Energy (BLE), an iBeacon™ and the RFID (Radio Frequency IDentification). As an alternate communication means with respect to the RF signal, a sound wave signal operating in the human being sound range or even in the ultrasonic range could be advantageously used. The communication unit 13 may receive, via its antenna, the RF signal or the ultrasonic signal transmitted from the antenna included in the communication unit 213 of the wireless tag 21. More particularly, the wireless tag 21 may be a long-range wireless tag, such as a passive long-range RFID (Radio Frequency IDentification) tag that is either IC (Integrated Circuit) based or SAW (Surface Acoustic Wave) based and operates, for example, in the UHF band or the ISM band. In this case, the communication unit 13 of the electronic apparatus 1 may include an RFID reader, in order to receive the status signal from the wireless tag 21.

On the other hand, the communication unit 13 may receive, via its microphone, the audio signal transmitted from the speaker included in the communication unit 213 of the wireless tag 21. Sound of the audio signal does not necessarily have to be audible to the user, as long as the sound is detectable by the microphone of the communication unit 13.

Figure 3:
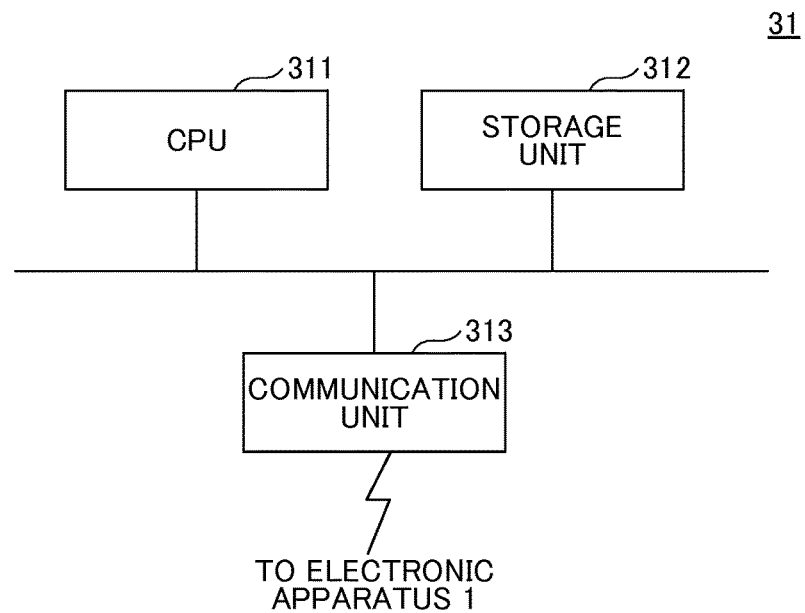
FIG. 3 is a block diagram illustrating an example of an external communication apparatus in one embodiment of the present disclosure.

FIG. 3 is a block diagram illustrating an example of the external communication apparatus in one embodiment of the present disclosure. The external communication apparatus 31 is provided at a location capable of transmitting the location information to the electronic apparatus 1 that enters the target region. For example, the external communication apparatus 31 may be provided at an entrance of the room forming the target region. The external communication apparatus 31 illustrated in FIG. 3 includes a CPU 311, a storage unit 312, and a communication unit 313.

The CPU 311 is an example of a processor that controls the operation of the external communication apparatus 31. The storage unit 312 stores programs to be executed the CPU 311, and various data including data or parameters used by the programs, intermediate data of computations performed by the programs, data related to location information which will be described later, or the like.

The CPU 311 may be replaced by dedicated hardware, such as a control circuit which controls the operation of the external communication apparatus 31.

The storage unit 312 may be formed by a semiconductor memory device or the like, for example. The communication unit 313 is wirelessly communicable with the communication unit 14 of the electronic apparatus 1. For the sake of convenience, the illustration of an antenna of the communication unit 313 is omitted in FIG. 3. In a case in which a WiFi (Wireless Fidelity, registered trademark) environment is usable within the room, for example, the communication between the external communication apparatus 31 and the electronic apparatus 1 may be performed via a WiFi (registered trademark) network.

Depending on a configuration of the external communication apparatus 31, the communication unit 14 of the electronic apparatus 1 may communicate with the external communication apparatus 31 by a signal selected from an RF signal, an UHF signal, an ISM signal, an SAW signal, a Bluetooth (registered trademark) signal, an iBeacon (registered trademark) signal, an ultrasonic signal, and an audio signal. The communication unit 14 may receive, via its antenna, the RF signal, the UHF signal, the ISM signal, the SAW signal, the Bluetooth (registered trademark) signal, the iBeacon (registered trademark) signal, or the ultrasonic signal transmitted from the antenna included in the communication unit 313 of the external communication apparatus 31. The communication unit 14 may receive, via its microphone, the audio signal transmitted from the speaker included in the communication unit 313 of the wireless tag 21. The CPU 311 may control the communication unit 313 to periodically broadcast the location information of the external communication apparatus 31.

In other words, the external communication apparatus 31 may be formed by a wireless tag, for example. In this case, the wireless tag forming the external communication apparatus 31 may be a passive type tag or an active type tag.

More particularly, the wireless tag forming the external communication apparatus 31 may be a long-range wireless tag, such as a passive long-range RFID (Radio Frequency IDentification) tag that is either IC (Integrated Circuit) based or SAW (Surface Acoustic Wave) based and operates, for example, in the UHF band or the ISM band. In this case, the communication unit 14 of the electronic apparatus 1 may include an RFID reader, in order to receive the location information from the wireless tag forming the external communication apparatus 31.

Figure 4:
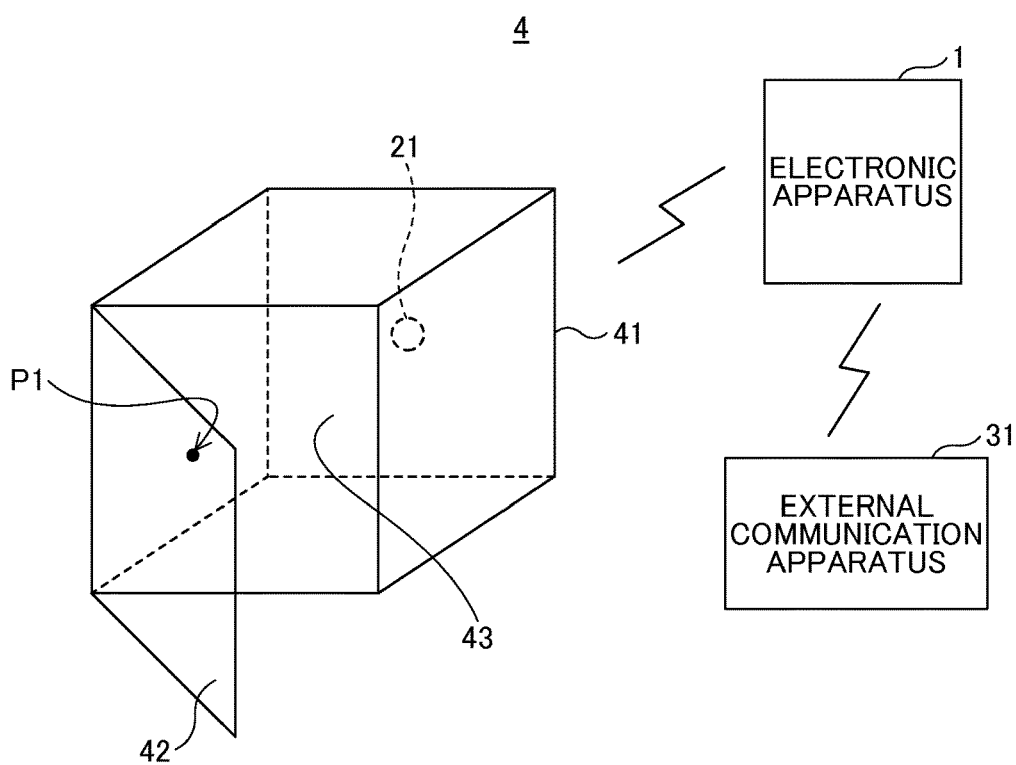
FIG. 4 is a diagram illustrating an example of a house furnishing arranged within a room.

FIG. 4 is a diagram illustrating an example of a house furnishing arranged within the room, together with the electronic apparatus 1 and the external communication apparatus 31 that form an activity monitoring system. As described above, the external communication apparatus 31 may be omitted in the activity monitoring system, in a case in which the user makes the user input from the input unit 15 of the electronic apparatus 1 to indicate entry of the electronic apparatus 1 into the target region.

In this example, a home appliance 4, such as a dishwasher, a gas or electric oven, a microwave oven, a toaster, a refrigerator, a television set, or the like, is an example of the house furnishing arranged within the room which is an example of the target region.

The home appliance 4 may be a high-end appliance or a low-end appliance, that is, the performance of the home appliance 4 may be arbitrary and independent of the performance of the wireless tag 21. In addition, the wireless tag 21 does not require the electrical connection to the circuitry of the home appliance 4, because the wireless tag 21 does not require power to be supplied from the home appliance 4, regardless of whether the wireless tag 21 is the passive type or the active type.

The home appliance 4 includes a casing 41, and a lid member 42 that is provided on the casing 41 and is free to open and close via a hinge (not illustrated), for example. The lid member 42 is an example of the member of the house furnishing arranged within the target region. The wireless tag 21 is provided inside the casing 41. The casing 41 may enclose an appliance cavity 43 in a state in which the lid member 42 is closed. The shapes of the casing 41, the lid member 42, and the appliance cavity 43 are not limited to those illustrated in FIG. 4, and the shapes may be arbitrarily selected.

In the example illustrated in FIG. 4, the wireless tag 21 is provided on an inner wall of the casing 41. However, the wireless tag 21 may be provided at any position where the wireless tag 21 is enclosed within the appliance cavity 43 of the casing 41 in the state in which the lid member 42 is closed, including a position P1 on an inner surface of the lid member 42, for example. The wireless tag 21 may be adhered to the casing 41 by an adhesive, for example.

The house furnishing is not limited to the home appliance 4, and may be formed by a doorway frame, a furnishing including furniture, or the like. In the case of the doorway frame, a door, that is an example of the member of the house furnishing arranged within the target region, may be provided on the doorway frame via hinge, for example. In this case, the wireless tag 21 may be provided on an inner side of the door, for example. In the case of the furnishing such as a kitchen cabinet, a cabinet door, that is an example of the member of the house furnishing arranged within the target region, may be provided on the furnishing via a hinge, for example. In this case, the wireless tag 21 may be provided inside the kitchen cabinet, for example.

In a case in which the casing 41 and the lid member 42 are made of a metal or a metal alloy, the status signal broadcast from the wireless tag 21 can be shielded by the casing 41 and the closed lid member 42. Hence, an intensity of the status signal received by the communication unit 13 of the electronic apparatus 1 from the wireless tag 21 enclosed within the casing 41 and the closed lid member 42 will become less than or equal to a threshold value, and the monitoring by the CPU 11 can recognize the closed state of the lid member 42. The status signal in this case may be any one of the RF signal, the UHF signal, the ISM signal, the SAW signal, the Bluetooth (registered trademark) signal, the iBeacon (registered trademark) signal, the ultrasonic signal, and the audio signal. On the other hand, the intensity of the status signal received by the communication unit 13 of the electronic apparatus 1 from the wireless tag 21 in a state in which the lid member 42 is open will become greater than the threshold value, and monitoring by the CPU 11 can recognize the open state of the lid member 42.

On the other hand, in a case in which the casing 41 and the lid member 42 are made of a non-metal or non-shielding material, such as plastic, wood, or the like, the status signal broadcast from the wireless tag 21 cannot be shielded by the casing 41 and the closed lid member 42, when the status signal is any one of the RF signal, the UHF signal, the ISM signal, the SAW signal, the Bluetooth (registered trademark) signal, the iBeacon (registered trademark) signal, and the ultrasonic signal. However, the status signal broadcast from the wireless tag 21 can be shielded by the casing 41 and the closed lid member 42, when the status signal is the audio signal. Hence, the intensity of the status signal (that is, the audio signal) received by the communication unit 13 of the electronic apparatus 1 from the wireless tag 21 enclosed within the casing 41 and the closed lid member 42 will become less than or equal to a threshold value, and monitoring by the CPU 11 can recognize the closed state of the lid member 42. The intensity of the status signal (that is, the audio signal) received by the communication unit 13 of the electronic apparatus 1 from the wireless tag 21 in a state in which the lid member 42 is open will become greater than the threshold value, and monitoring by the CPU 11 can recognize the open state of the lid member 42.

According to the configurations described above that shield the wireless tag 21 within the casing 41 in the state in which the lid member 42 is closed, the wireless tag 21 does not require the sensor 214, and an inexpensive wireless tag, such as a passive type tag, may be used for the wireless tag 21. On the other hand, the power consumption of the electronic apparatus 1 can be reduced, because the communication unit 13 of the electronic apparatus 1, that communicates with the wireless tag 21, is activated only when the electronic apparatus 1 is within the target region.

In the case in which the casing 41 and the lid member 42 are made of the non-metal material, and the status signal broadcast from the wireless tag 21 is any one of the RF signal, the UHF signal, the ISM signal, the SAW signal, the Bluetooth (registered trademark) signal, the iBeacon (registered trademark) signal, the ultrasonic signal, and the audio signal, it is also possible to utilize the sensor 214 of the wireless tag 21. In other words, the CPU 211 may control the communication unit 213 to periodically broadcast the status signal indicating the user activity only when the sensor 214 senses the user activity. Hence, the monitoring by the CPU 11 can recognize the open and closed states of the lid member 42 based on the status signal received by the communication unit 213.

According to this configuration that does not shield the wireless tag 21 within the casing 41 in the state in which the lid member 42 is closed, the wireless tag 21 is preferably an active type tag that includes the sensor 214. In this case, the wireless tag 21 broadcasts the status signal only when the sensor 214 senses the open state of the lid member 42, for example. In this case, although the sensor 214 is normally active, the power consumption of the wireless tag 21 may be suppressed compared to a case in which the wireless tag 21 is constantly broadcasting, because the broadcasting in most cases consumes more power when compared to the maintaining the sensor 214 active. On the other hand, the power consumption of the electronic apparatus 1 can be reduced, because the communication unit 13 of the electronic apparatus 1, that communicates with the wireless tag 21, is activated only when the electronic apparatus 1 is within the target region.

The sensor 214 may sense user activities other than the opening and closing of the lid member 42, such as turning the power of the home appliance 4 ON and OFF, turning a lamp or light of the home appliance 4 ON and OFF, turning a motor or a fan of the home appliance 4 ON and OFF, or the like. For example, the lamp of the home appliance 4 may be at least one of a power-ON lamp and a power-OFF lamp. Because the wireless tag 21 can be adhered on the home appliance 4 or provided at a position in a vicinity of the home appliance 4 and capable of sensing the user activity, the user may easily set up the home appliance 4 and the wireless tag 21 associated therewith. It is also possible to suppress the cost of the home appliance 4 provided with the wireless tag 21, because the wireless tag 21 itself may be inexpensive, and it is unnecessary to exclusively design and manufacture the home appliance 4 in consideration of the wireless tag 21.

Figure 5:
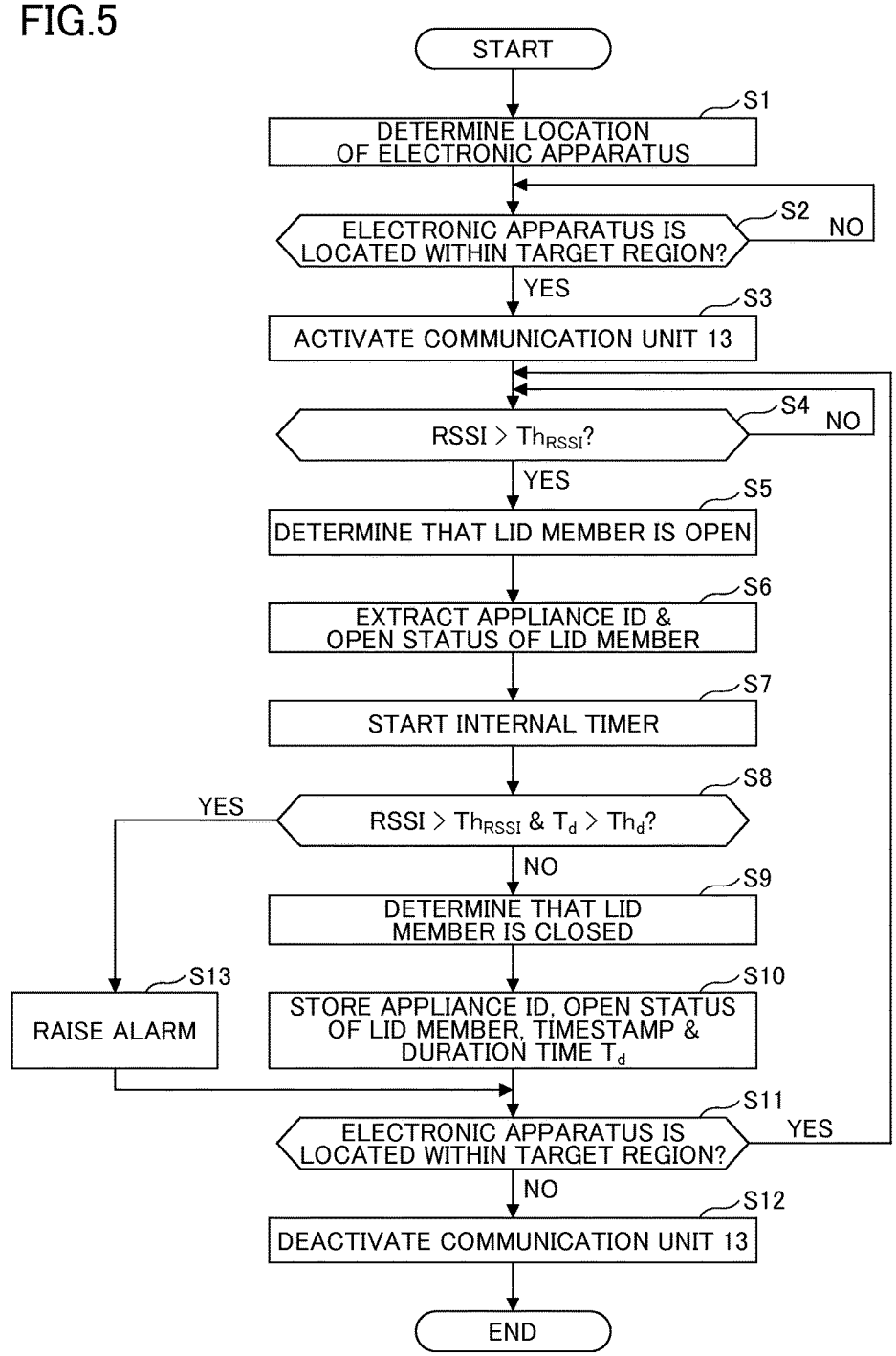
FIG. 5 is a flow chart for explaining an example of a process performed by the electronic apparatus.

FIG. 5 is a flow chart for explaining an example of a process performed by the electronic apparatus. The process illustrated in FIG. 5 may be performed by the CPU 11 of the electronic apparatus 1.

In FIG. 5, the CPU 11, in step S1, determines the location of the electronic apparatus 1. Step S1 may be performed based on the location information received from the external communication apparatus 31, or based on the user input from the input unit 15, as described above. The CPU 11, in step S2, decides based on the determination of step S1, whether the electronic apparatus 1 is located within the target region. The target region is the kitchen in this example. Step S2 is repeated when a judgment result in step S2 is NO, and the process advances to step S3 when the decision result in step S2 is YES.

The CPU 11, in step S3, activates the communication unit 13 in order to listen to an RF signal forming the status signal, from an RFID tag forming the wireless tag 21, for example. The CPU 11, in step S4, decides whether an RSSI (Received Signal Strength Indication) level of the received RF signal is greater than a threshold level $Th_{RSSI}$. Step S4 is repeated when a decision result in step S4 is NO, and the process advances to step S5 when the decision result in step S4 is YES.

The CPU 11, in step S5, determines that the lid member 42 of the home appliance 42 is open. In this example, the home appliance 42 is a dishwasher. The CPU 11, in step S6, extracts from the RF signal forming the status signal, an appliance ID of the dishwasher forming the home appliance 4 and an open status of the lid member 42, which are embedded in the RF signal, and stores the appliance ID and the open status in the storage unit 12, together with a timestamp. The timestamp may be derived from an internal clock of the CPU 11, such as an RTC (Real Time Clock), for example. For example, the appliance ID may be labeled during an initial association process that Bluetooth (registered trademark) standard imposes, between the electronic apparatus 1 and the wireless tag 21. The CPU, in step S7, starts an internal timer of the CPU 11 from a time when the RF signal is received by the communication unit 13. This internal timer counts a duration time $T_d$ for which the lid member 42 is open, and this internal timer is stopped at a time when the RSSI level of the RF signal including the appliance ID of the dishwasher, received by the communication unit 13, becomes less than or equal to the threshold level $Th_{RSSI}$.

The CPU 11, in step S8, decides whether the RSSI level of the received RF signal is greater than the threshold level $Th_{RSSI}$ for the duration time $T_d$ greater than a duration threshold $Th_d$. When the decision result in step S8 is NO, the CPU 11, in step S9, determines that the lid member 42 of the dishwasher is closed. The CPU 11, in step S10, stores the appliance ID, the open status of the lid member 42, the timestamp, and the duration time $T_d$ in the storage unit 12. The timestamp may indicate the time when the lid member 42 is opened, and the time when the lid member 42 is closed. The information stored in the storage unit 12 may be registered as a log file that is locally accessible by the electronic apparatus 1 or remotely accessible from an external apparatus that is connectable, by cable or by wireless, to the electronic apparatus 1.

The CPU 11, in step S11, decides whether the electronic apparatus 1 is located within the kitchen, based on the location information received from the external communication apparatus 31, or based on the user input from the input unit 15, as described above. When the decision result in step S11 is YES, the process returns to step S4.

When the decision result in step S11 is NO, the CPU 11, in step S12, deactivates the communication unit 13 in order to stop listening to the RF signal forming the status signal, from the RFID tag forming the wireless tag 21, for example. The process ends after step S12.

When the decision result in step S8 is YES, the CPU 11, in step S13, raises an alarm to indicate an abnormal dishwasher usage in which the lid member 42 remains open for the duration time $T_d$ exceeding the duration threshold $Th_d$. The process advances to step S11 after step S13.

Of course, the abnormality detection is not limited to that described above with reference to FIG. 5. For example, if the user uses a toaster every morning, the abnormal toaster usage may be detected when the lid member 42 of the toaster is not opened for more than a predetermined time of 24 hours, for example. In addition, if the user watches television every day, for example, the abnormal television usage may be detected when a power-ON lamp of television set is not turned ON and sensed by the sensor 214 of the wireless tag 21 for more than a predetermined time of 24 hours, for example.

According to this embodiment, it is possible to monitor a log of the daily user activities, for example, such as the use of the dishwasher, the oven, the toaster, the refrigerator, the television set, or the like. Hence, it is possible to detect, from the monitored log, whether the user is carrying out daily user activities according to a known activity pattern. Furthermore, the electronic apparatus may monitor a plurality of user activities related to different home appliances or the like. An analysis of a workflow of the opening and closing events of the lid members of the home appliances enables calculation of the daily open-state duration of the lid members and allow recurrent user activities within the kitchen to be inferred, for example.

Therefore, the disclosed activity monitoring method may be useful for monitoring anomalies in the activities of elderly people by sensing their everyday life activities, especially in the kitchen.

Each home appliance to be monitored is associated with a wireless tag which may be set up by the user, such as within the casing of the home appliance, for example. The wireless communication between the electronic apparatus and the wireless tag may use the BLE (Bluetooth Low Energy) accessory known from "http://www.smartbeacon.eu/" or "http://www.beaconic.nl/en/", for example. Because of the variety of home appliances to which the wireless tag are to be associated, the wireless tag is preferably waterproof and heat-resistant in a temperature range in which the home appliances operate.

Combined with other home appliances in the kitchen for which open-state durations can be stored in the electronic apparatus, a learning machine may infer from the stored open-state durations the normal and abnormal activity types that are performed by the user, for example. The abnormal activity type may be notified to the user by a message or the like on the display to indicate an abnormal appliance usage. A typical message notification message may read "Is it normal for the dishwasher door to still be open?", for example.

In a case in which the target region is the interior of a vehicle, for example, the wireless tag may be attached to specific objects, such as a wallet, a bag, sun glasses, a dog collar, or the like, in order to monitor people or pets inside the vehicle. In this case, the vehicle may be equipped with an activity monitoring apparatus, and communicate with the wireless tag using the passive RFID tag technology, a WiFi (registered trademark) environment, or the like, for example.

The activity monitoring apparatus may monitor a length of time the dog, for example, is left inside the vehicle by monitoring the status signal from the wireless tag attached to the dog collar. The activity monitoring apparatus may also detect the dog escaping outside the vehicle, for example, by monitoring the decreasing intensity of the status signal from the wireless tag attached to the dog collar. The monitored results of the activity monitoring apparatus may be automatically notified to an external apparatus, such as a smartphone.

In addition, in a case in which the target region is a residential area in which a vehicle is normally parked and a residential gateway is provided at a boundary of the residential gateway, the activity monitoring apparatus may be provided at the residential gateway. In this case, the activity monitoring apparatus may monitor a length of time the vehicle remains within the residential area by monitoring the status signal from a wireless tag attached to the vehicle. The activity monitoring apparatus may also detect the exiting of the vehicle outside the residential area, for example, by monitoring the decreasing intensity of the status signal from the wireless tag attached to the vehicle. The monitored results of the activity monitoring apparatus may be automatically notified to an external apparatus, such as a smartphone. Hence, an unauthorized use of the vehicle exiting the residential area, for example, can be notified to the external apparatus.

According to this embodiment, it is possible to suppress the cost of the house furnishing provided with the wireless tag, because it is unnecessary to exclusively design and manufacture the house furnishing to be provided with the wireless tag that is inexpensive. In addition, the user may easily set up the house furnishing provided with the wireless tag, since no wired Internet connection or the like is required. The wireless tag does not require the electrical connection to the circuitry of the home appliance, because the wireless tag 21 does not require power to be supplied from the home appliance 4, regardless of whether the wireless tag 21 is the passive type or the active type. On the other hand, the power consumption of the electronic apparatus can be reduced, because the communication unit of the electronic apparatus, that communicates with the wireless tag, is activated only when the electronic apparatus is within the target region.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the present principles. Although the embodiments of the present disclosure have been described in detail, it should be understood that the various changes, substitutions, and alterations could be made hereto without departing from the scope of the invention.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system.".

A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

The invention claimed is:

1. An electronic apparatus comprising:
   a first communication unit configured to communicate with a tag located on a member within a target region when the first communication unit is active within the target region;
   a processor configured to monitor a status of the member within the target region based on an intensity of a status signal received by the first communication unit from the tag located on the member, said processor including an internal timer, said timer is initiated to measure a duration time indicating a period upon determining the intensity of the status signal is above a level, wherein the status identifies a first open position of the member during which the status signal is above the level and a second closed position of the member during which the status signal is below the level; and
   a memory configured to store the status signal received from the tag with a time stamp and the duration time during which the member is in the first open position, the status signal with the time stamp and duration time forming a log file enabling monitoring of the status for the member and detection of activities, wherein said processor is further configured to detect the status of the member being different from a pattern stored in the log file and, upon detecting the status of the member is different from the stored pattern, provide a notification.

2. The electronic apparatus as claimed in claim 1, wherein the processor is further configured to determine whether the electronic apparatus is located within the target region, so as to activate the first communication unit when the electronic apparatus is located within the target region.

3. The electronic apparatus as claimed in claim 2, further comprising: a second communication unit configured to receive location information so that the processor determines that the electronic apparatus is located within the target region.

4. The electronic apparatus as claimed in claim 1, wherein the first communication unit communicates with the tag by a signal belonging to a group comprising at least: a Radio Frequency signal, an Ultra-High Frequency signal, an Industry Science Medical signal, a Surface Acoustic Wave signal, a Bluetooth signal, an iBeacon signal, an ultrasonic signal, and an audio signal.

5. The electronic apparatus as claimed in claim 1, wherein the processor is configured to determine the duration time, the duration time measuring a period for which the member is open, based on the intensity of the status signal.

6. The electronic apparatus as claimed in claim 5, wherein the processor is configured to trigger an alarm when the determined duration time exceeds a threshold time.

7. The electronic apparatus as claimed in claim 5, wherein the memory is further configured to store at least the monitored activity.

8. An activity monitoring method to be implemented in an electronic apparatus, comprising:
communicating with a tag located on a member within a target region when a first communication unit of the electronic apparatus is active within the target region;
monitoring, by the first communication unit, a status of the member within the target region based on an intensity of a status signal received from the tag located on the member, the status identifying a first open position of the member during which the status signal is above a level and a second closed position of the member during which the status signal is below the level;
initiating a timer upon determining the intensity of the status signal is above a level;
determining a duration time indicating a period during which the intensity of the status signal is above the level indicating the member is in the first open position;
storing the status signal received from the tag with a time stamp and the duration time during which the member is in the first open position, the status signal with the time stamp and duration time forming a log file enabling monitoring of a status for the member;
detecting the status of the member being different from a pattern stored in the log file; and
upon detecting the status of the member is different from the stored pattern, provide a notification.

9. The activity monitoring method as claimed in claim 8, further comprising: determining whether the electronic apparatus is located inside the target region, activating the first communication unit of the electronic apparatus when the electronic apparatus is located within the target region.

10. The activity monitoring method as claimed in claim 9, comprising receiving, by a second communication unit of the electronic apparatus, location information to determine that the electronic apparatus is located within the target region.

11. The activity monitoring method as claimed in claim 8, wherein the first communication unit communicates with the tag by a signal belonging to a group comprising at least: a Radio Frequency signal, an Ultra-High Frequency signal, an Industry Science Medical signal, a Surface Acoustic Wave signal, a Bluetooth signal, an iBeacon signal, an ultrasonic signal, an audio signal.

12. The activity monitoring method as claimed in claim 8, further comprising: determining a duration time for which the member is open, based on the intensity of the status signal.

13. The activity monitoring method as claimed in claim 12, further comprising: triggering an alarm when the duration time detected by the detecting exceeds a threshold time.

14. The activity monitoring method as claimed in claim 12, further comprising: storing, in a storage unit of the electronic apparatus, at least the monitored activity and the determined duration time.

15. A non-transitory computer readable medium having stored thereon a computer program product at least one of downloadable from a communication network and recorded on a medium at least one of readable by a computer and executable by a processor, said computer program product including program code instructions for implementing an activity monitoring method comprising:
communicating with a tag located on a member within a target region when a first communication unit of an electronic apparatus is active within the target region;
monitoring, by the first communication unit, a status of the member within the target region based on an intensity of a status signal received from the tag located on the member, the status identifying a first open position of the member during which the status signal is above a level and a second closed position of the member during which the status signal is below the level;
initiating a timer upon determining the intensity of the status signal is above a level;
determining a duration time indicating a period during which the intensity of the status signal is above the level indicating the member is in the first open position;
storing the status signal received from the tag with a time stamp and the duration time during which the member is in the first open position, the status signal with the time stamp and duration time forming a log file enabling monitoring of a status for the member;
detecting the status of the member being different from a pattern stored in the log file; and
upon detecting the status of the member is different from the stored pattern, provide a notification.

\* \* \* \* \*

UNITED STATES PATENT AND TRADEMARK OFFICE
CERTIFICATE OF CORRECTION

PATENT NO. : 10,038,945 B2
APPLICATION NO. : 14/952608
DATED : July 31, 2018
INVENTOR(S) : Philippe Gilberton, Guillaume Bichot and Ali Louzir It is certified that error appears in the above-identified patent and that said Letters Patent is hereby corrected as shown below:

In the Claims

Column 12, Line 49; Claim 1, delete "member and detection of activities," and insert --member,--

Signed and Sealed this
Twelfth Day of March, 2024

*Katherine Kelly Vidal*

Katherine Kelly Vidal
*Director of the United States Patent and Trademark Office*